S. H. MEAD.
Ore Amalgamator.
No. 33,257.
Patented Sept. 10, 1861.
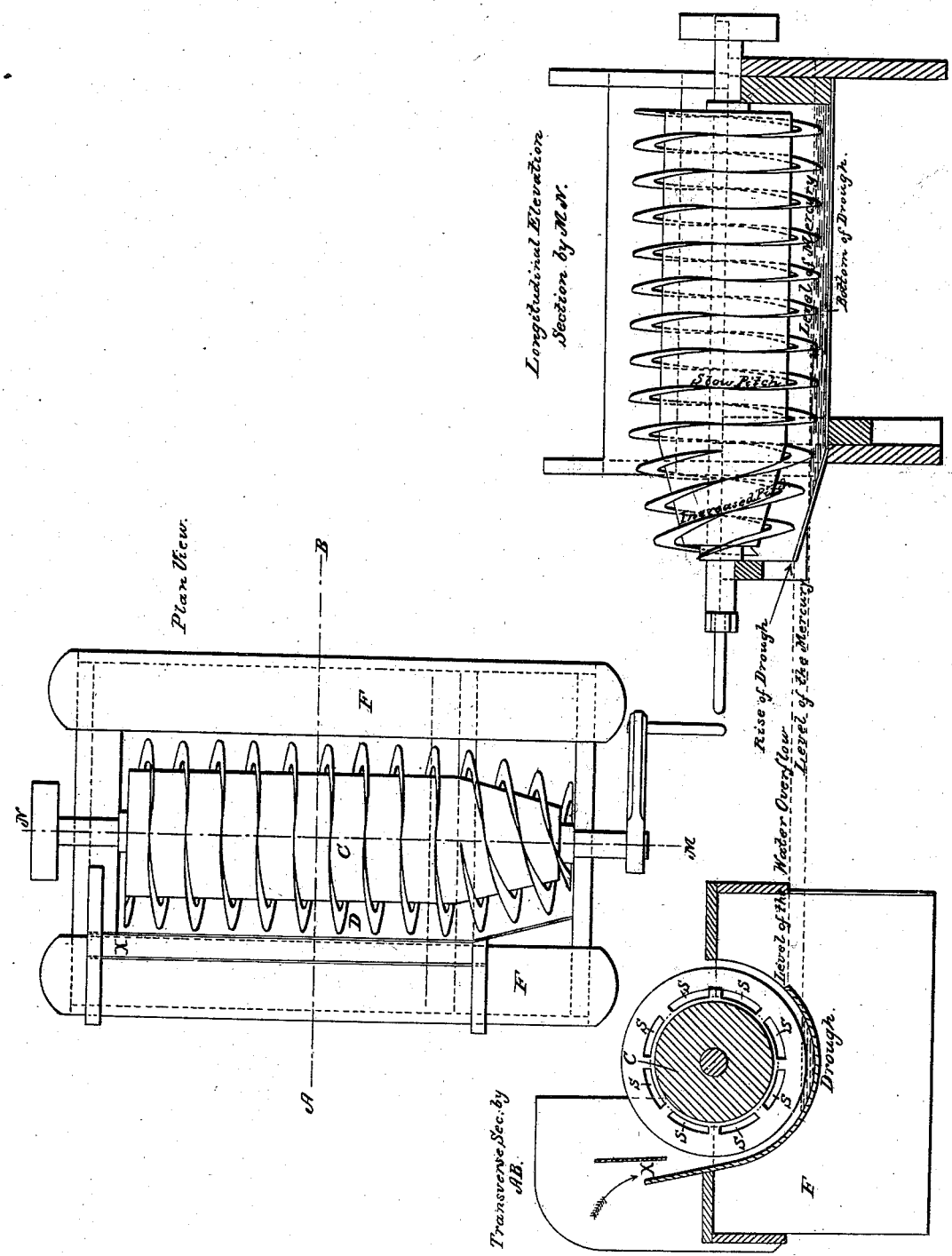

UNITED STATES PATENT OFFICE.

SETH H. MEAD, OF ST. ANDREW'S, NEW YORK.

MACHINE FOR SEPARATING GOLD FROM EARTHS, &c.

Specification forming part of Letters Patent No. 33,257, dated September 10, 1861.

*To all whom it may concern:*

Be it known that I, SETH H. MEAD, of St. Andrew's, in the county of Orange and State of New York, have invented a new and Improved Mode for Separating Gold from Earth or from Crushed Quartz or from any Foreign Substance; and I do hereby declare that the following is a full and exact description of the same.

F represents the frame in which is secured a semicircular trough D.

C is a cylinder, which revolves in this trough D. This cylinder is provided with an endless screw over its whole length and is conical on one end. The conical part of the cylinder has an increased pitch to facilitate the ejection of all foreign matter floating on the top of the mercury in the trough. The trough has also a rise on one end, in order to correspond with the cone of the cylinder. The pitch of the screw is open nearest the cylinder, as shown at S S S S in drawing, in order to facilitate the free circulation of the water in trough.

X is the aperture or sluice through which the material and water are admitted into the machine. This sluice may be reduced to any given length.

*Modus operandi:* The bottom of the trough is charged sufficiently with mercury, so as to dip the outside periphery of the screw-plates around the cylinder about one-quarter inch into said mercury. The handle (or the pulley) of the cylinder is now turned to the right, during which manipulation the quartz and the water are now admitted through the aperture X and nearest to the large end of the cylinder, from which end it moves toward the conical side of said cylinder. By this operation the auriferous matter is precipitated to the bottom of the trough; second, the heaviest of the foreign matter is carried away over the mercury and ejected at the end of the cone, and, third, all the floating substances are at once carried over the side of the trough by the water.

What I claim as my invention, and wish to secure by Letters Patent, is—

1. The cylinder, in combination with an endless screw, as described, the screw to have an increased pitch toward and on the conical part of the cylinder, for the purpose set forth.

2. Making the thread of the screw with an open space next the cylinder for the purpose of facilitating the free circulation of the water above the mercury, as described.

SETH H. MEAD.

Witnesses:
EDWARD BISSELL,
A. M. RONK.